United States Patent [19]
Strässle et al.

[11] Patent Number: 6,116,808
[45] Date of Patent: Sep. 12, 2000

[54] CLAMPING DEVICE FOR DETACHABLY CONNECTING TWO PROFILED PARTS

[75] Inventors: Marcel Strässle; Kurt Züllig, both of Kirchberg, Switzerland

[73] Assignee: Syma Intercontinental AG, Kirchberg, Switzerland

[21] Appl. No.: 09/068,937
[22] PCT Filed: Nov. 26, 1996
[86] PCT No.: PCT/CH96/00415
  § 371 Date: May 21, 1998
  § 102(e) Date: May 21, 1998
[87] PCT Pub. No.: WO97/20148
  PCT Pub. Date: Jun. 5, 1997

[30] Foreign Application Priority Data

Nov. 28, 1995 [CH] Switzerland .......................... 3377/95

[51] Int. Cl.[7] ................................................ F16B 7/04
[52] U.S. Cl. ................. 403/252; 403/255; 403/322.1
[58] Field of Search ................................. 403/230, 231, 403/245, 252, 255, 322.1, 254, 409.1

[56] References Cited

U.S. PATENT DOCUMENTS

| | | | |
|---|---|---|---|
| 4,101,231 | 7/1978 | Streib | 403/252 |
| 4,345,849 | 8/1982 | Stenemann | 403/252 |
| 4,455,103 | 6/1984 | Hackenberg | 403/322.1 X |
| 4,690,582 | 9/1987 | Maier et al. | 403/252 |
| 4,787,769 | 11/1988 | Michael | 403/252 |
| 4,799,819 | 1/1989 | Swoboda | 403/252 |
| 4,974,987 | 12/1990 | Smock | 403/252 |
| 4,983,065 | 1/1991 | Spath | 403/252 |
| 5,127,761 | 7/1992 | Vieler | 403/252 |
| 5,143,474 | 9/1992 | Vieler | 403/252 |
| 5,209,598 | 5/1993 | Zullig | 403/252 |
| 5,464,298 | 11/1995 | Schomakers | 403/252 |

FOREIGN PATENT DOCUMENTS

| | | |
|---|---|---|
| 123 683 | 11/1984 | European Pat. Off. . |
| 506 607 | 9/1992 | European Pat. Off. . |
| 2 152 941 | 4/1973 | France . |
| 576 591 | 4/1974 | Switzerland . |
| WO 93/25820 | 12/1993 | WIPO . |

*Primary Examiner*—Harry C. Kim
*Attorney, Agent, or Firm*—Sughrue, Mion, Zinn, Macpeak & Seas, PLLC

[57] ABSTRACT

The invention concerns a clamping device for detachably connecting two profiled parts (1, 19). There can be inserted and secured in a first profiled part (1) an insert core (2) comprising an axially movable slide (7) with an end part having a projection (17, 18) which can be at least partially inserted into an opening in a second profiled part (19) in order to exert clamping pressure against a portion of the second profiled part (19), which portion partially closes the opening. The slide (7) is flat, and the insert core (2) comprises two inner grooves for axially guiding the slide (7). Rotatably guided in the insert core (2) is an eccentric (5). When the eccentric head (4) is rotated, the eccentric roller (22) presses against the inner wall (30) of a recess (12) in the slide (7) in order to move the latter into the insert core (2) into a position which enables the projection to exert the aforementioned clamping pressure.

15 Claims, 11 Drawing Sheets

CLAMPING DEVICE FOR DETACHABLY CONNECTING TWO PROFILED PARTS

The present invention relates to a clamping device for detachably connecting two profiled parts in accordance with the preamble of Patent Claim 1.

A clamping device disclosed in CH-A-576 591 serves for connecting the profiled parts of removable frames and/or walls. For this purpose, there is provided a longitudinally displaceable bolt which is guided in an insert core and which, at its head end, is of T-shaped design in order to engage behind a slot in another profiled part. The bolt is displaced longitudinally by a screw having a conical tip being pressed eccentrically against a conical recess, serving as a tightening surface, in the bolt.

Another clamping device of this type is disclosed in EP-B1-0 506 607. In this clamping device the bolt has supporting means for the pivotable mounting of a plurality of retaining parts, each retaining part and the inner walls of the insert core comprising a system of sliding surfaces in order to enable the retaining parts to pivot when there is an axial movement of the bolt. The free end regions of the retaining parts are in each case designed in the form of a hook in order to exert the desired clamping pressure when pivoting.

A further clamping device of this type is disclosed in EP-B1-0 123 683. In this clamping device the stay bolt is secured by being extended by means of a rod with a widened end part, and by the insert core being provided with spreading fingers and having inwardly protruding pumps in order to engage behind the widened end part. A snap fastening of this type can also be implemented by means of an integrally moulded-on sleeve having at least one longitudinal slot in which is guided a pin which is arranged diagonally in the rod.

Furthermore, French Patent 2,152,941 describes a device having retaining elements which are mounted rotatably about an axis arranged in a positionally fixed manner in the housing. This device does not have a bolt and a screw engaging in the bolt via sliding surfaces; rather, the retaining elements are pivoted by an eccentric, the height of which corresponds to the width of the housing. The housing does not have any sliding surfaces causing the retaining elements to pivot when they are moved axially; rather, the sliding surfaces are located in the eccentric and in the lower region of the retaining elements or of a pressure-transmitting part which displaces the retaining elements.

The object of the present invention is to provide an improved clamping device of the type mentioned at the beginning.

This object is achieved according to the invention by a clamping device having the features given in the characterizing part of Patent Claim 1.

Further advantageous refinements of the invention are given in the dependent claims.

The invention is explained in more detail below with reference to a drawing by way of example, in which.

Figure 1:
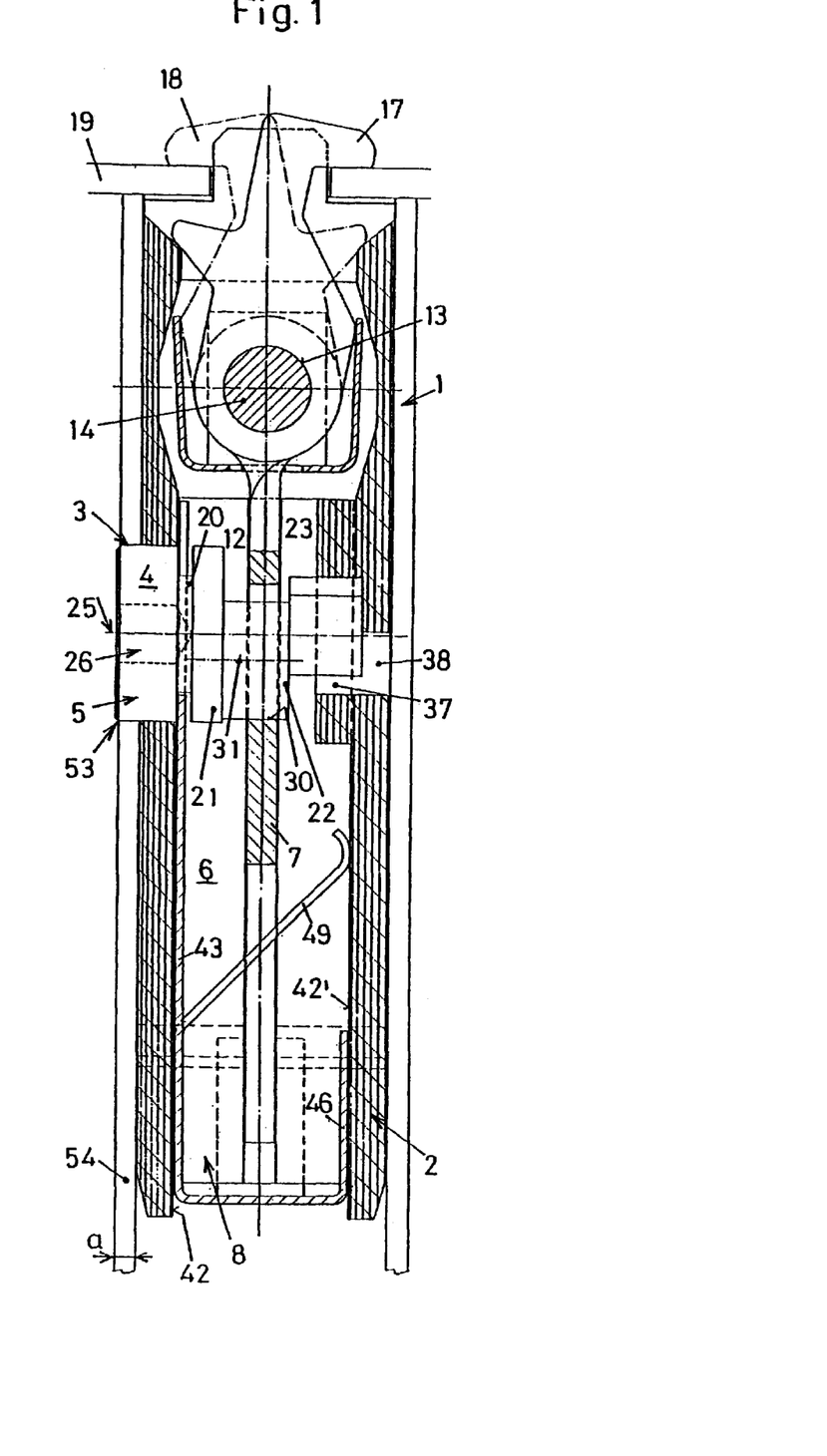
FIG. 1 shows a sectional illustration through the eccentric axis of a clamping device according to the invention with the insert core in the closed state.

FIG. 1 shows an insert core 2, preferably made of a lightweight material such as plastic or aluminium, which has been inserted into a first profiled part 1 and fixed in position. The insert core 2 is provided with a transverse bore 3, for receiving the head 4 of an eccentric 5, and with an elongated interior space, also called internal channel 6, for receiving a preferably non-elastic or rigid anchor or slide 7, which can be produced by diecasting or as a punched part.

The profiled part 1 and the insert core 2 may, for example, be similar to the corresponding elements described in CH-A-576 591 or EP-B1-0 506 607 or EP-B1-0 123 683.

The anchor 7 is mounted displaceably in the channel 6, it also being possible for a helical spring or compression spring 8' (merely outlined in FIG. 3) to be accommodated in the internal end region 8 of the channel 6.

Figure 2:
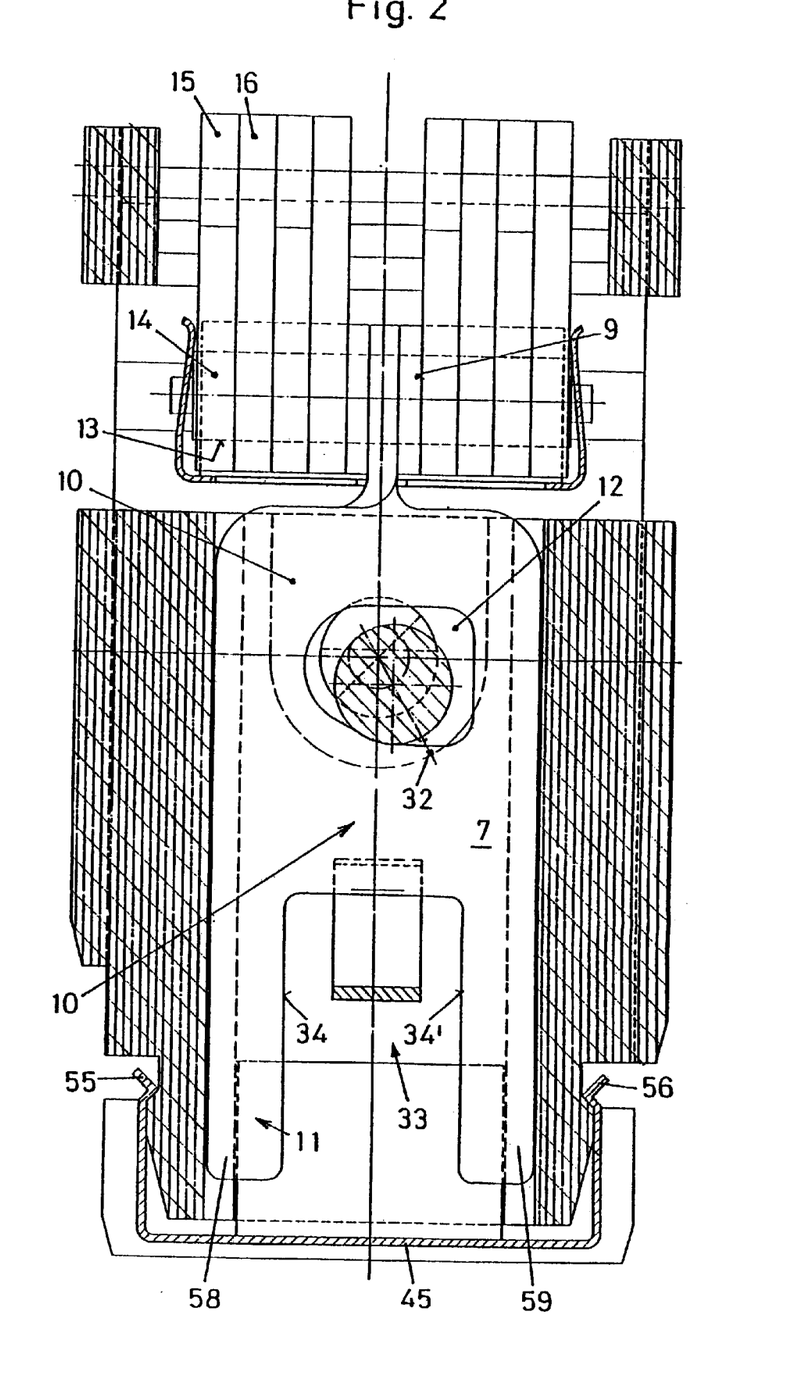
FIG. 2 shows a plan view of part of this clamping device and its slide.

FIG. 2 shows that the slide 7 is of wide and flat design and has three portions, namely an upper coupling portion 9, a middle eccentric portion 10 and a lower bottom portion 11, and that the eccentric portion 10 has an asymmetrical cutout 12. The coupling portion 9 can be a tab which is extended somewhat like a sword, is rotated through 90° and has a bore 13 (FIG. 1) for a shaft 14 which serves for the pivotable mounting of retaining parts or latches 15, 16. Retaining parts of this type are known per se from EP-B1-0 506 607 and have a projection 17, 18 (FIG. 1) which can be inserted into an opening in a profiled part 19 in order to exert clamping pressure against a portion of this profiled part 19, which portion partially closes the opening, these latches 15, 16 preferably being stacked such that they are flat and alternate with the projection 17, 18 in either direction, to be precise, are uniformly distributed on both sides of the coupling portion 9.

The eccentric 5 of the clamping device has an eccentric head 4 having diameter D, an eccentric neck 20 and an eccentric flange 21, these preferably being designed such that they are concentric. Moreover, the eccentric has an eccentric roller 22, which is arranged eccentrically with respect to the eccentric head 4 and has diameter d, and an eccentric stop roller 23, which is coaxial with the eccentric head and has the nominal diameter d', where D>d and d≅d'. The eccentric neck 20 can be formed by a constriction in the eccentric head 4.

Figure 3:
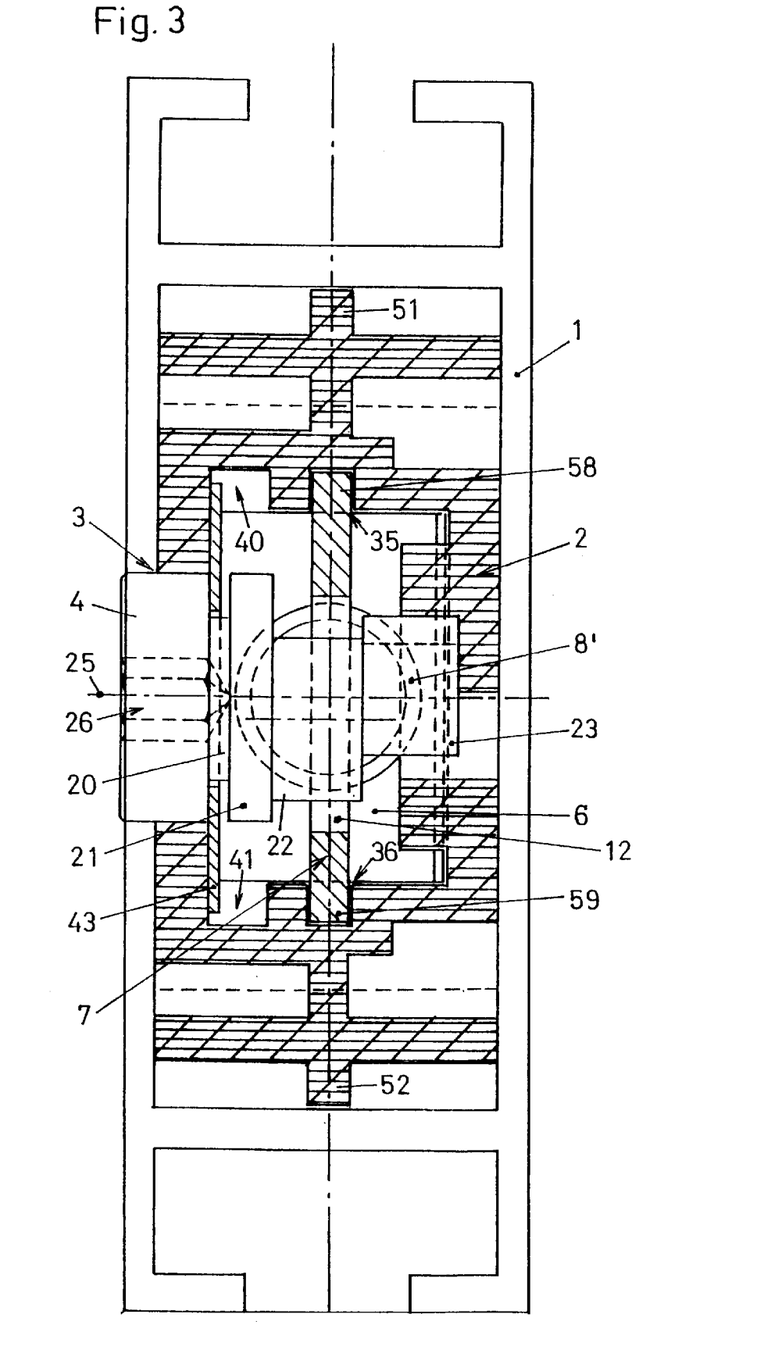
FIG. 3 shows a sectional illustration of the eccentric portion of this clamping device in a plane transversely with respect to the longitudinal axis.

FIGS. 1 and 3 show, in cross-section, the cutout 12 which is located in the middle region of the eccentric portion 10 of the slide 7. This cutout 12 is specially designed to receive the eccentric roller 22 and to interact with it when the anchor 7 is displaced.

FIGS. 1 and 2 show the clamping device in a closed position in which the slide 7 is retracted, i.e. is extended inwards, and the retaining parts 15, 16 are located in a pivoted position in which the projection 17, 18 engage behind the profiled part 19. The round eccentric head 4 is mounted such that it can be rotated about its axis 25 in the bore 3 in the insert core 2 and has a concentric square socket or hexagon socket 26 or other rotating means enabling it to pivot with the aid of a spanner.

Figure 4:
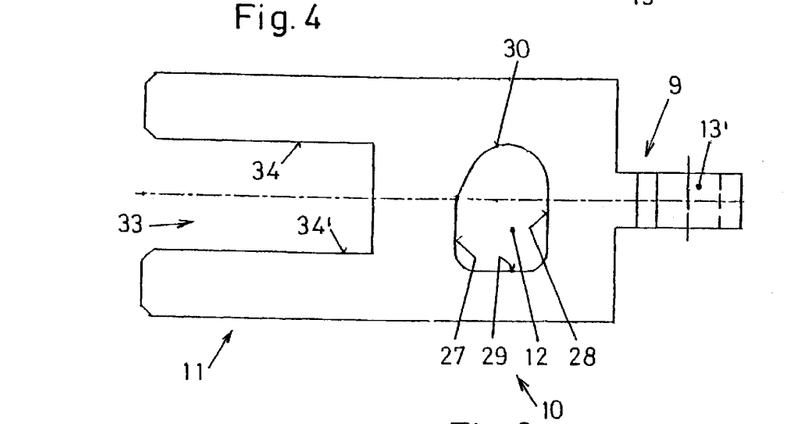
FIGS. 4 and 5 show illustrations of a variant of a slide of this type.

FIG. 4 shows, with reference to a variant of the slide 7, that the continuous cutout 12 is bounded at least approximately by two virtually parallel border walls 27, 28, a lower border wall 29, which runs parallel to the longitudinal axis of the anchor and approximately perpendicularly with respect to the walls 27, 28, and an upper border wall 30 which is designed such that it is arcuate in the right-hand region near the coupling portion 9 and such that it is oblique in the left-hand region. The walls 27 to 30 extend perpendicularly with respect to the flat plane of the slide 7.

The axis 25 of the eccentric head 4 and the axis 31 of the eccentric roller 22 define a plane 32 (FIG. 2) which can be pivoted about the axis 25 and, when the clamping device is being closed, moves in the clockwise direction in order to retract the slide 7, i.e. to press it downwards, to be precise, essentially without rotating it.

The bottom portion 11 of the slide 7 is provided with a relatively wide indentation 33, the walls 34, 34' of which run parallel to the longitudinal axis of the anchor 7 and which can serve, amongst other things, for holding or guiding a compression spring.

Figure 5:
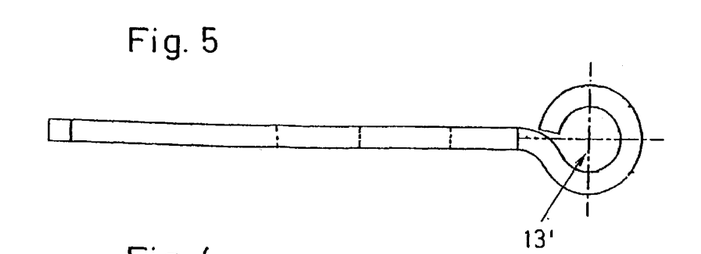

In the variant according to FIGS. 4 and 5 the coupling portion 9 of the slide 7 is not axially rotated through 90°, as in the embodiment according to FIGS. 1 and 2; rather, it is bent through approximately 360° about an axis running transversely with respect to the displacement direction in order to form an opening 13' instead of a bore 13.

Figure 6:
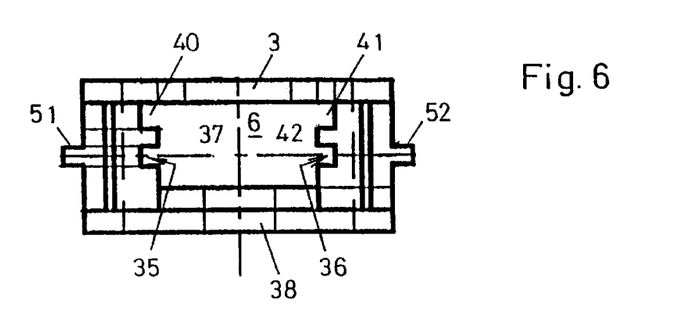
FIGS. 6 to 8 show illustrations of an insert core.
Figure 7:
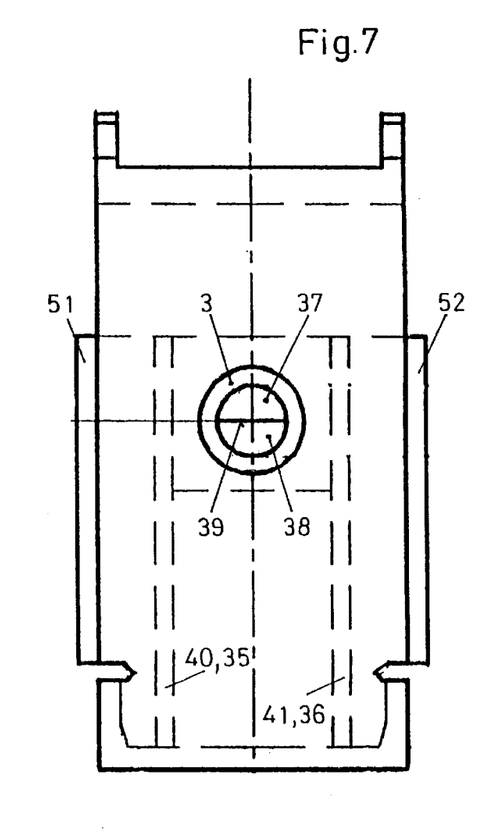
Figure 8:
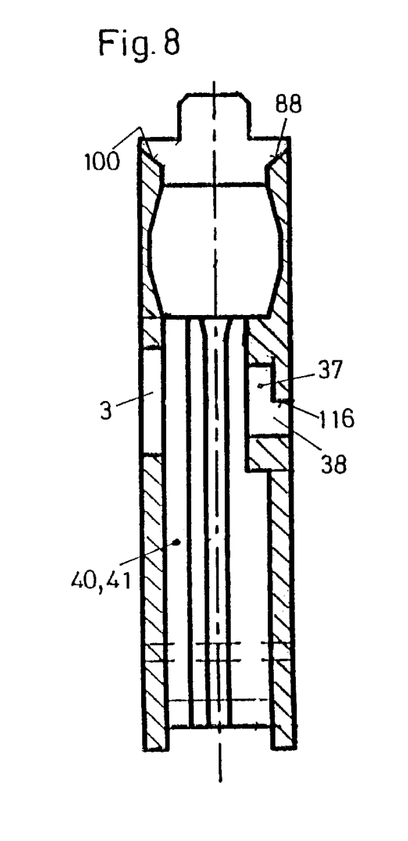

The insert core 2 can be formed in one piece or by two matching, flat shells which are bonded to one another or are fastened by screws. FIGS. 6 to 8 illustrate, by way of example, a one-piece insert core in the form of an elongated parallelepiped. The internal channel 6 of the insert core 2 has two elongated, preferably central, grooves 35, 36 which serve as a guide for the flat border portions 58, 59 of the slide 7.

On one wide side of the insert core 2 there is the transverse bore 3 in which the eccentric head 4 is rotatably mounted. Coaxially with the transverse bore 3, on the opposite wide side of the insert core 2, is provided a round recess 37 in which the eccentric stop roller 23 can be rotated. The round recess 37 (FIG. 8) communicates with a further recess 38 which has, for example, a crescent-shaped cross-section and is bounded by a plane 39 which is located at a small distance from the axis 25 and runs perpendicularly with respect to the axis of movement of the slide 7. In the interior of the insert core according to FIG. 3 or 6 there are also provided two further grooves 40, 41 which communicate with the internal channel 6 and run parallel to the grooves 35, 36. The grooves 35 and 40 are located in the region between the axis of movement of the slide and one narrow side of the insert core, and the grooves 36, 41 are located in the region between the axis of movement and the other narrow side of said core. The upper walls of the grooves 40 and 41 are provided, according to FIG. 6, as extensions of the large internal wall 42 of the insert core in order to form a widened sliding surface for a resilient locking plate 43 (FIG. 1). Should the insert core and/or the locking plate 43 have different dimensions, it would also be possible to do without these grooves 40, 41.

Figure 9:
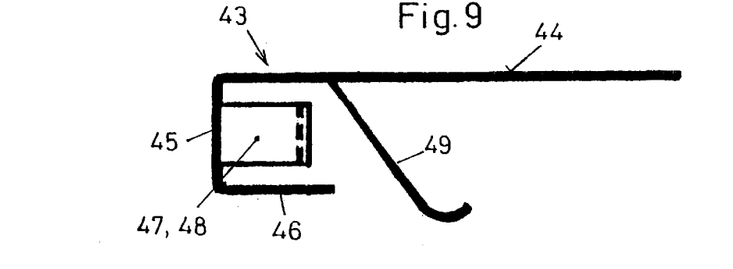
FIGS. 9 and 10 show illustrations of a resilient locking plate from the side and from above.
Figure 10:
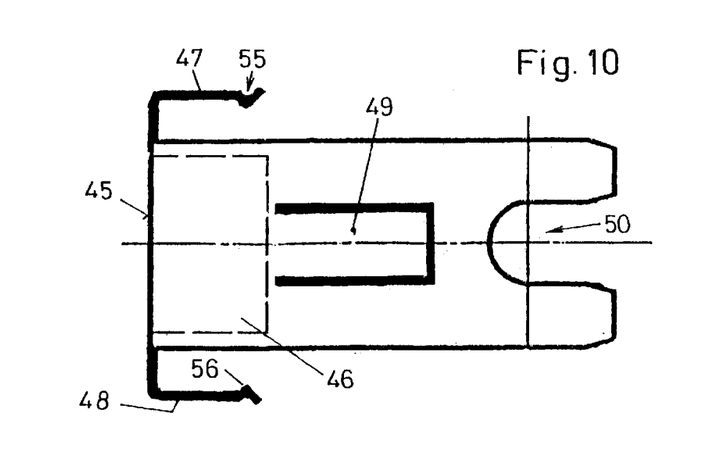

It can be seen in FIGS. 9 and 10 that the locking plate 43 has an end which is bent in a U shape and has a transverse strip 45, running perpendicularly with respect to a sliding plane 44, and a tab 46, running parallel to the sliding plane 44, and that the transverse strip 45 includes two tabs 47, 48 which are bent at the sides and run perpendicularly with respect to the sliding plane 44 of the locking plate 43.

The locking plate 43 has an elongated tongue or lamella 49 which is formed by a U-shaped incision and is pressed downwards, to be precise until it is below the space defined by the tabs 46, 47, 48 in order to form a spring finger. That end region of the locking plate 43 which is opposite the transverse strip 45 has a preferably central, fork-like opening 50 in the form of an open elongated hole, the surface of which is therefore defined by a semicircle and, more or less, a rectangle.

FIGS. 6, 7, 8 illustrate, by way of example, an insert core according to the invention, this having a preferably central rib 51, 52 on each of its narrow longitudinal sides, in order to form a sliding tongue and groove connection with a corresponding profiled part. These ribs may be dispensed with in other variants. In the embodiment according to FIG. 3, these ribs 51, 52 serve for preventing lateral movements of the insert core within the profiled part.

The clamping device according to the invention from FIGS. 1 to 10 functions as follows:

The locking plate 43 (FIGS. 9, 10) can be completely accommodated in the internal channel 6 of the insert core 2 in such a manner that the outer sliding plane 44 touches that wide, inner wall 42 (FIG. 6) of the insert core 2 on which the transverse bore 3 is located, that the transverse strip 45 is located in the bottom region (FIG. 2) of the insert core 2, and that the tab 46 touches the other wide inner wall 42' (FIG. 1) of the insert core 2, in the region of the opening 8, the spring tongue 49 then developing a force which presses the sliding plane 44 against the wall 42 of the insert core 2. In the fitted state the eccentric neck 20 is inserted into the opening 50 with the result that the borders of this opening, because of the spring force of the spring tongue 49, press the eccentric head 4 captively outwards by the locking plate 43 simultaneously being displaceable with respect to the eccentric 5.

In order then to be able to receive the clamping device in one profiled part 1, the latches 15, 16, . . . have to be pulled outwards, i.e. upwards, according to FIG. 1, by the eccentric head being rotated in order to find a position in which the crescent-shaped end of the eccentric stop roller 23 covers the crescent-shaped recess 38 in the insert core 2. At this instance, pressure exerted by fingers or a tool on the end surface of the eccentric head 4 causes the eccentric 5 to be introduced into the insert core at least to an extent such that the surface of the eccentric head 4 is flush with the surface of the insert core, since this pressure caused the crescent-shaped end of the eccentric stop roller 23 to be inserted into the complementary, crescent-shaped recess 38 in the insert core 2.

In this position the insert core 2 can be received into the profiled part 1 and brought therein sufficiently far for the eccentric head 4, because of the spring force of the spring tongue 49, to be pressed out through a corresponding, round opening 53 in the profiled part 1 and thus fixed in position. After the fixing in position, the clamping device is in an operating position.

When the eccentric head 4 is rotated with the aid of a spanner, the eccentric roller 22 presses against the oblique part of the wall 30 of the cutout 12 and thereby also presses the slide 7 downwards and, as a result, the latches 15, 16, . . . spread, and the clamping device closes. For opening it, the eccentric head 4 is rotated in the other direction of rotation, in which the spreading action of the latches ceases, and the latches can be pulled out of the profiled part 19. The mode of operation of the latches is the same as in the case of the clamping device according to EP-B1-0 506 607. The coupling portion 9 can also be designed with a head end in the shape of a T, as in the case of the clamping device according to CH-A-576 591. The insert core 2 and/or the other portions of the slide can otherwise resemble those in any of the devices according to the patents mentioned at the beginning.

It can be seen in FIGS. 1 and 3 that the height of the eccentric roller 22 is greater than the sum of the thickness of the slide 7 and the thickness a of that corresponding wall 54 of the profiled part 1 on which the clamping device is fixed in position. In FIG. 1 the orientation of the spring tongue 49 corresponds to the oblique fraction stroke "/". This spring tongue 49 could also be of reversed design, namely like an oblique separating slash "\".

In order to retain the locking plate 43 captively, the ends 55, 56 of the tabs 47, 48 are bent, with the result that they can be wedged in corresponding, outer grooves in the insert core 2 which run parallel to the axis 25.

Figure 11:
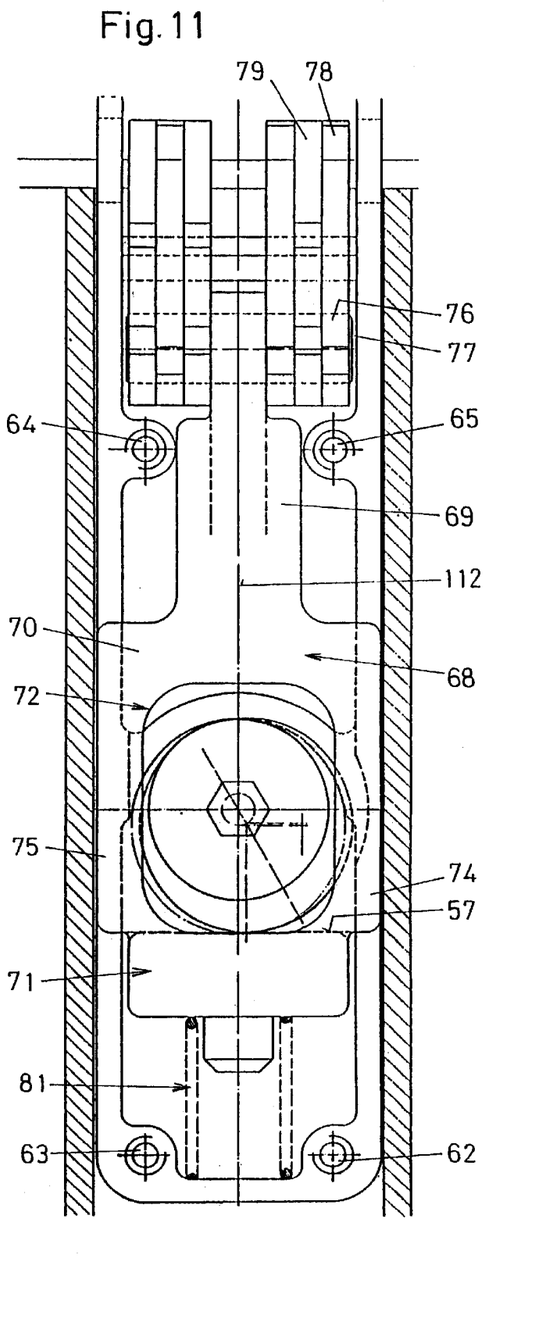
FIG. 11 shows a plan view of a further embodiment of the clamping device according to the invention with special latches.
Figure 12:
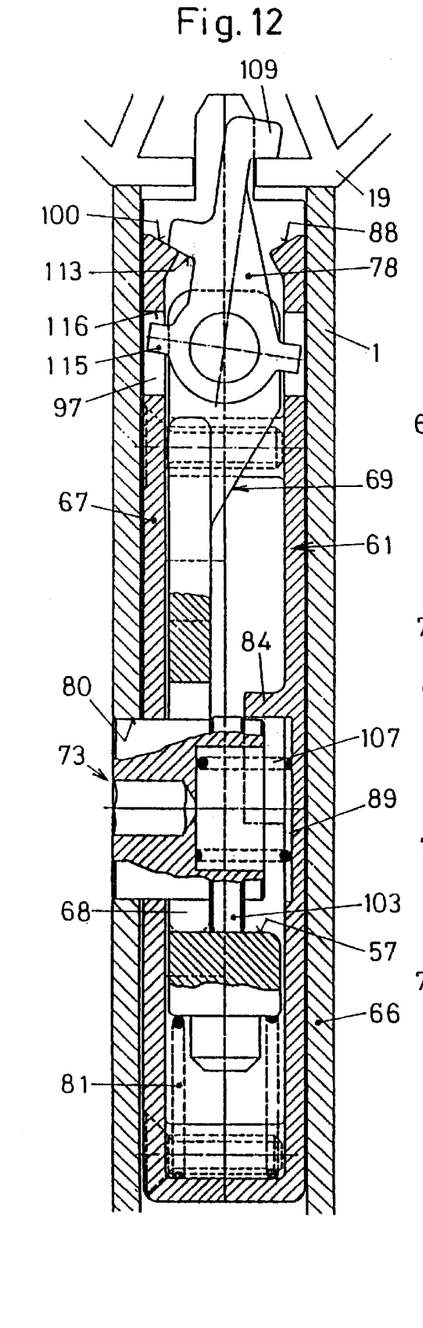
FIG. 12 shows a sectional illustration through the eccentric axis of this embodiment.

In the variant of the clamping device according to the invention from FIGS. 11 and 12 the insert core 61 comprises two elongated shells 66, 67 which are connected by four screws 62, 63, 64, 65 and form the housing of the clamping device. Accommodated between the shells 66, 67 is a slide 68 which can be displaced in the longitudinal direction and which likewise has a coupling portion 69, an eccentric portion or locking portion 70 and a bottom portion 71. The eccentric portion 70 has a continuous cutout 72 through which an eccentric 73 is guided. The eccentric portion 70 is designed such that it is at least partially in the form of a plate with two parallel, flat side borders or border portions 74, 75 which are held displaceably in corresponding recesses designed as slots or grooves in the housing. The coupling portion 69 is provided with a transverse bore 76 in order to support a shaft 77 which bears the latches 78, 79. The upper shell 67 has a round transverse bore 80 for the rotatable mounting of the eccentric 73. A helical spring 81 is clamped between the bottom of the housing and the bottom portion 71 of the slide, which helical spring presses the slide 68 outwards.

Figure 13:
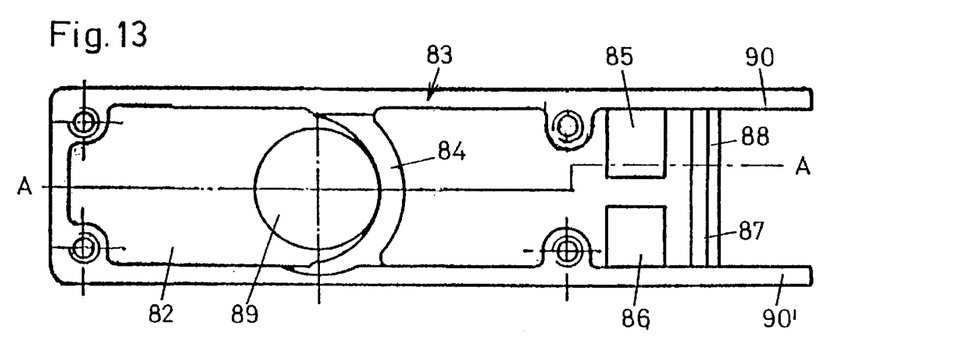
FIG. 13 shows a plan view of the lower housing part of this embodiment.
Figure 14:
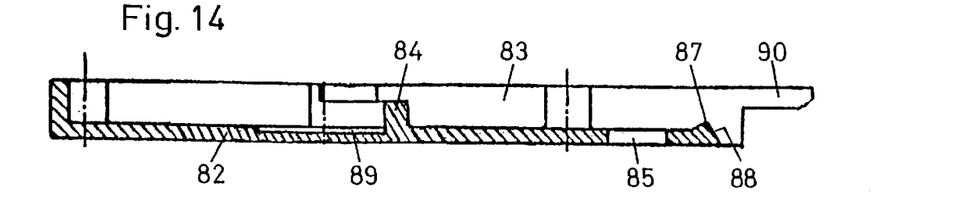
FIG. 14 shows a sectional illustration according to the line A—A in FIG. 13.

The lower shell according to FIGS. 13 and 14 has a wide housing wall 82 which is bordered by a long, thin, U-shaped, rib-like, narrow side wall 83. The two longer portions of the side wall are connected by an arcuate rib 84 which is lower in height than the side wall 83. In the region of the latches the housing wall 82 has two rectangular openings 85, 86, and its end region is designed in the form of a raised edge 87 which ends with a ramp 88. The housing wall 82 has a small depression 89 which is bounded by a circle running preferably tangentially with respect to the arcuate rib 84. The free ends of the U-shaped side wall 83 can each have a narrow, sword-like extension 90, 90' for protecting the latches. The U-shaped side wall 83 has four extensions with threaded holes for the screws 62, 63, 64, 65 (FIG. 11).

Figure 15:
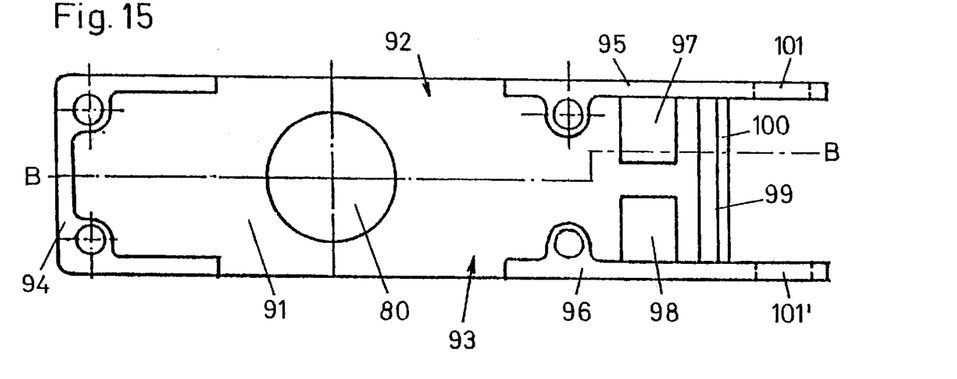
FIG. 15 shows a plan view of the upper housing part of this embodiment.
Figure 16:
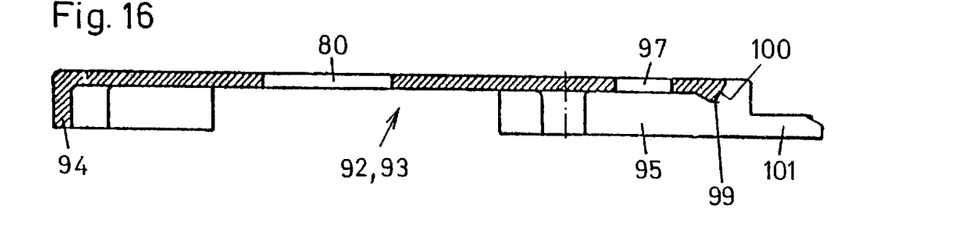
FIG. 16 shows a sectional illustration according to the line B—B in FIG. 15.

The upper shell according to FIGS. 15 and 16 essentially consists of a wide housing wall 91 and a rib-like border having two interruptions 92, 93 which delimit a thin, U-shaped, rib-like, narrow side wall 94 forming the bottom of the clamping device, and two straight, rib-like parts 95, 96 in the region of the latches. The upper shell contains the clear opening 80 (FIG. 12) for the eccentric 73. In the region of the latches the housing wall 91 has two rectangular openings 97, 98, and its end region is designed in the form of a thickened portion having an edge 99 and a ramp 100. The rib-like border has four extensions having holes for the screws 62, 63, 64, 65 (FIG. 11). The free ends of the straight, rib-like parts 95, 96 can each have a narrow, sword-like extension 101, 101' in order, together with the extensions 90, 90' laterally to cover the latches.

Figure 17:
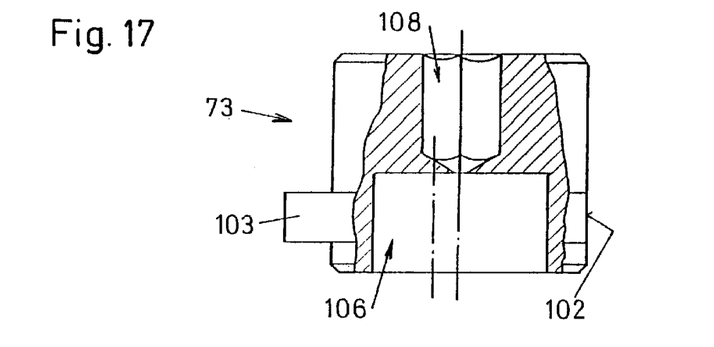
FIG. 17 shows a sectional illustration of an eccentric for this embodiment.
Figures 18, 19:
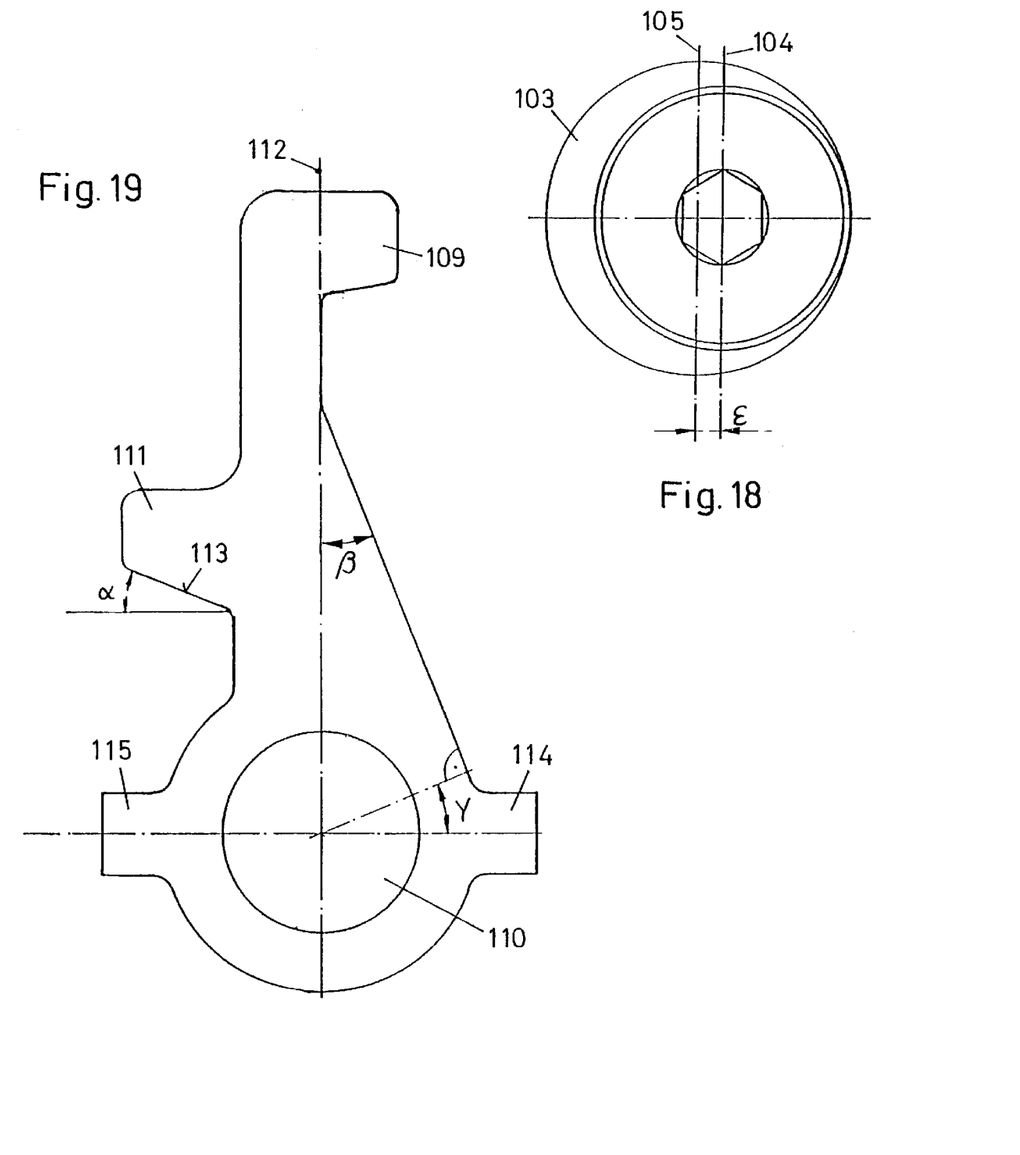
FIG. 18 shows a plan view of an eccentric of this type.
FIG. 19 shows a view of a special latch of this type.

The eccentric 73 according to FIGS. 17 and 18 has essentially three cylindrical regions having a common surface line 102 and having heights which decrease from the top downwards. The middle region, which has a larger diameter than the other two, forms an eccentric roller 103 having an eccentricity $\epsilon$ between the axis 104 of the eccentric 73 and the axis 105 of the eccentric roller 103. On its lower end surface the eccentric 73 has a cylindrical recess 106 in which is held a compression spring 107 (FIG. 12). On the upper end surface it has a hexagon socket 108.

FIG. 19 illustrates an embodiment of a latch which has a projection 109 in one end region, a bore 110 in the other end region, and in a middle region an extension 111 having a surface 113 which is inclined with respect to the axis 112 of displacement by an angle a with regard to a perpendicular line. The relationship $\alpha=\beta=\gamma$ preferably applies for the three angles given in FIG. 19.

The latch according to the special embodiment of FIG. 19 has two extensions 114, 115 which are designed such that their outsides are symmetrical to the axis 112 and also symmetrical to the diametrical transverse axis of the bore 110 and the size of which ensures that in the fitted state the extensions 114, 115 of a plurality of latches can pivot in the space of the openings 85, 86, 97, 98.

The clamping device according to the invention from FIGS. 11 to 19 functions as follows:

The spring 81 presses said slide 68 outwards in the longitudinal direction, while the spring 107 presses the eccentric 73 outwards in the transverse direction. The eccentric roller 103 is mounted rotatably in the clear cutout 72 which is of more or less rectangular design with rounded corners. When the eccentric 73 is rotated, the slide 68 is displaced in the longitudinal direction because of the eccentricity of the eccentric roller 103. FIGS. 11 and 12 illustrate the clamping device in the closed state, by the latches being pivoted against the inclined surface 113 (FIG. 19) because of the pressure of the ramp 100 or 88, the eccentric roller 103 exerting a pressure against the bottom portion 71 of the slide in the region of the cutout 72 and the surface line 102 (FIG. 17) being supported in the concave side of the arcuate rib 84. In this state, the projection 109 engages under the profiled part 19 (FIG. 12) and exerts a clamping pressure against a portion thereof, and the eccentric 73 is firmly fixed in position between the bore 80, the bottom portion 71 and the rib 84, with the result that the slide 68 is in a stable position.

In order to open the clamping device the eccentric 73 is rotated through about 180° with the aid of a hexagonal spanner, the eccentric roller 103 thereby pulling the slide 68 outwards during the rotation. During this movement the front borders 116 (FIG. 12) of the openings 85, 86, 97, 98 serve as a stop for the extensions 114, 115 of the latches, which thereby assume a straight position, and the clamping device can be pulled out of the second profiled part 19.

In order to free the clamping device from the first profiled part 1, it can be brought into the closed state according to FIG. 12 but preferably without the latches engaging under the second profiled part. This is because in this state the eccentric 73 can be pressed in against the action of the spring 107 without the eccentric roller 103 abutting against the rib 84. In order to make it possible for the clamping device to be fitted in the profiled part 1, the entire height of the eccentric 73 is smaller than the distance between the bottom of the depression 89 and the outer surface of the shell 67.

Figure 20:
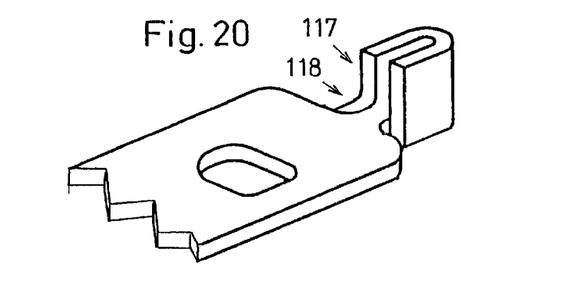
FIG. 20 shows a schematic illustration of a sled-like slide having a hammer head bent off on one side as clamping element.

It is also possible to use as clamping element a slide head which is designed in the shape of an L or T and which otherwise may also be designed as a so-called, bent hammer head 117 according to FIG. 20.

The coupling portion of the slide according to FIG. 20 has a middle extension 117 which is bent over in one process step at an angle of between 90° and 360° about a perpendicular line with respect to the direction of displacement, and in another process step the neck 118, which connects the extension 117 to the slide, is rotated through 90° axially in the direction of displacement.

Figure 21:
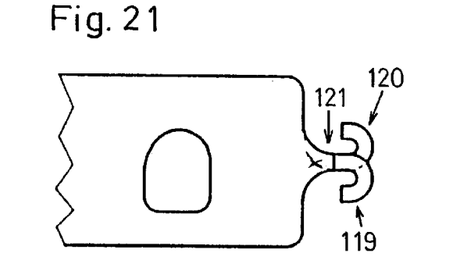
FIG. 21 shows a schematic illustration of a sled-like slide having a hammer head bent off on both sides as clamping element.

The coupling portion of the slide according to FIG. 21 has two extensions 119, 120 which are arranged symmetrically with respect to the longitudinal axis and of which in one process step the first is bent over about a perpendicular line with respect to the direction of displacement at an angle of between 90° and 360° in one direction and the second is bent over at the same angle in the other direction, and in a further process step the neck 121, which connects the two extensions jointly to the slide, is rotated through 90° axially in the longitudinal direction.

Figure 22:
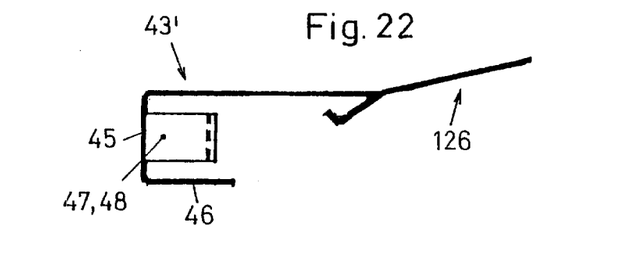
FIGS. 22 and 23 show illustrations of a further embodiment of a resilient locking plate from the side and from above.
Figure 23:
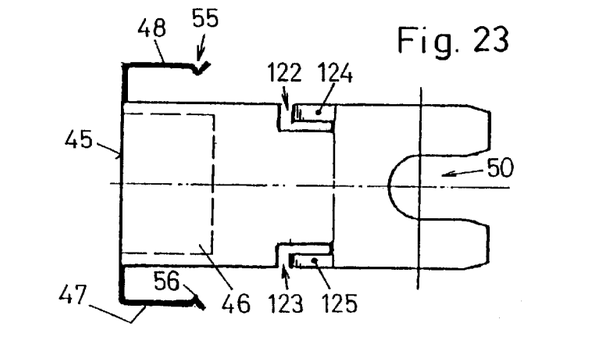

The locking plate 43' according to FIGS. 22 and 23, which basically corresponds to the embodiment according to FIGS. 9 and 10, has, however, two lateral lamellas 124 and 125 which are formed by a respective L-shaped incision 122 or 123 and which are bent downwards, to be precise approximately until they are in the same plane as that end portion 126 of the locking plate 43' which is correspondingly bent upwards.

Figure 24:
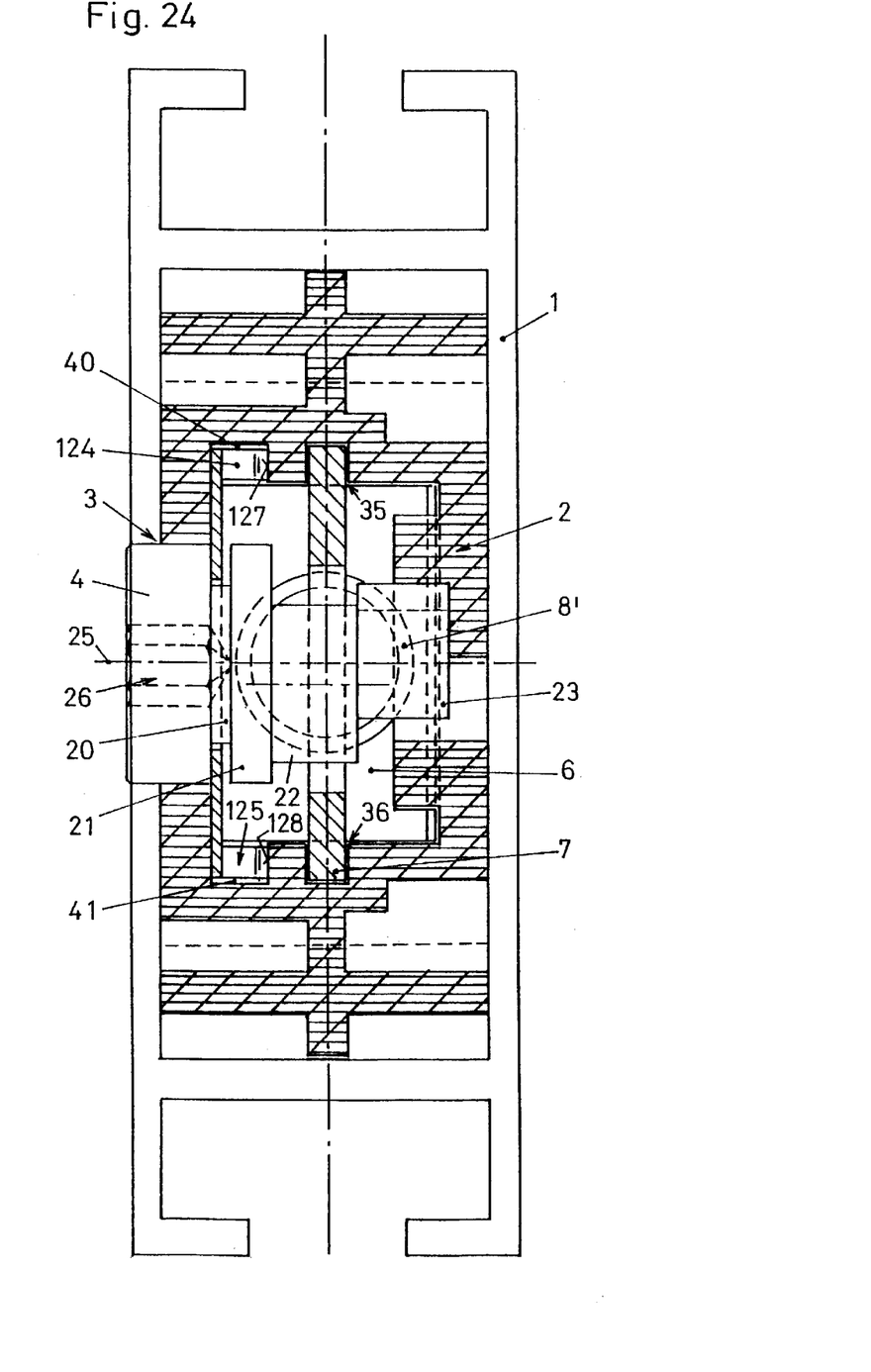
FIG. 24 shows a sectional illustration of the eccentric portion in a clamping device having a locking plate according to FIGS. 22, 23 in a plane transversely with respect to the longitudinal axis.

FIG. 24 shows that the tongues 124 and 125 press against the other side walls 127, 128 of the grooves 40, 41. In this case, it is possible to dispense with the indentation 33 (FIG. 4) or to replace it by two parallel slots for the optional spring 8'.

Figure 25:
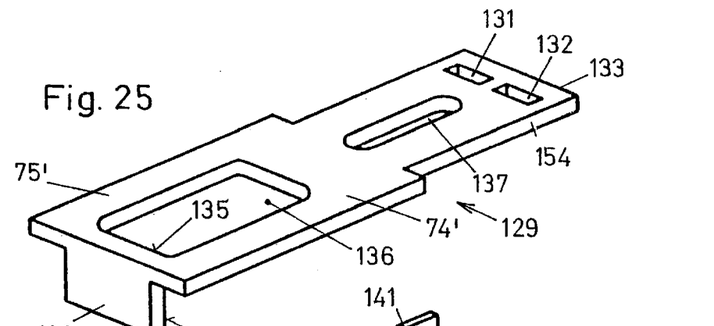
FIGS. 25 and 26 show perspective illustrations of further variants of a slide.
Figure 26:
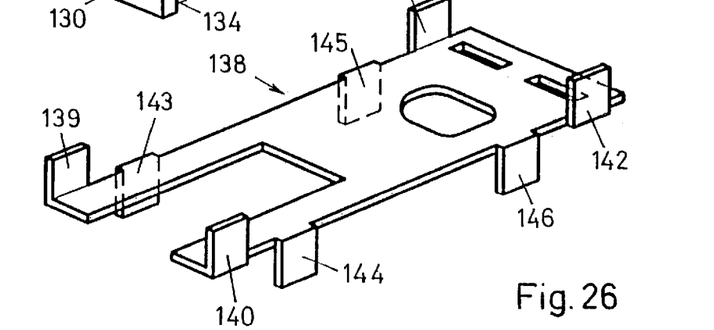

The slide 129 according to FIG. 25 is a punched part having a contracted, bent end which forms a tab 130 and having two slots 131 and 132 which are located in the other end region of the slide 129 and run parallel to the narrow end edge 133 thereof. The inner wall 134 of the tab 130 is flush with one part of the inner wall 135 of the cutout 136, at least in a middle region, exactly as is the case with the shoulder 57 with regard to the cutout 72 (FIGS. 11, 12). The extended side borders 74', 75' of the slide 129 (FIG. 25) can be guided by the recesses 92, 93 (FIG. 16) or by the grooves 35, 36 (FIG. 6), and if the latter were the case, the tab 130 would be dispensed with and the recess 136 would have a different shape. If appropriate, it is possible for there to be a central elongated hole 137 in order to connect the two shells by one screw serving as a replacement for the screws 64, 65 (FIG. 11).

In a further refinement of the invention a slide 138 can be a punched part having four tabs 139, 140, 141, 142 which are angled upwards and four tabs 143, 144, 156, 146 which are angled downwards, with the result that the grooves 35, 36 (FIG. 6) or the recesses 92, 93 (FIG. 16) can be omitted, but the insert core then having to have corresponding sliding surfaces for the ends of the tabs 139 to 146.

Figure 27:
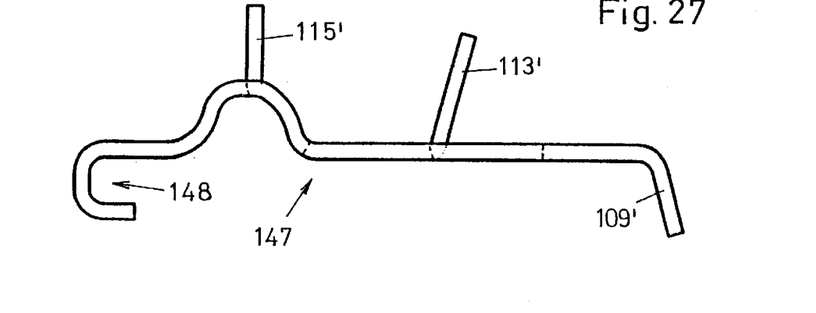
FIGS. 27 and 28 show illustrations of two further embodiments of the special latches.

In a further refinement of the invention a latch assembly can be replaced, according to FIG. 27, by a retaining part 147 designed as a punched part. This retaining part 147 has a bent end 148, two cut-in tabs 115', 113' which are bent outwards and an angled end 109'.

The end 148 is introduced into the slot 131 or 132 (FIG. 25). The tabs 115' and 113' fulfil the same functions as the extension 115 and the surface 113 (FIG. 19). The end 109' acts in the same manner as the projection 109 (FIG. 19).

Figure 28:
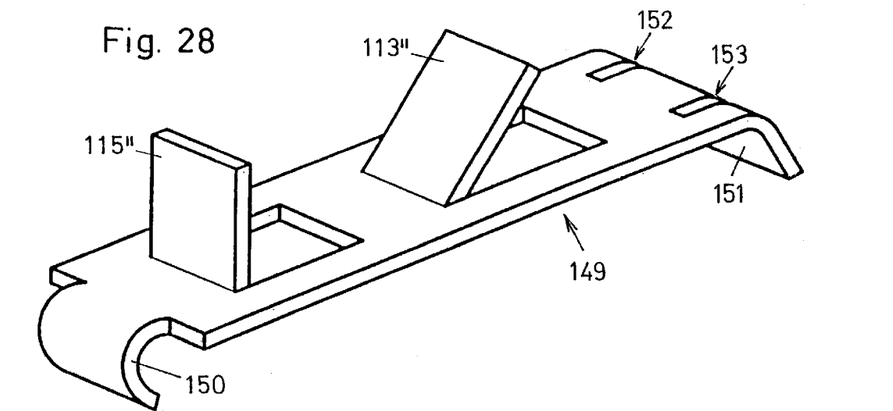

The retaining part 149 according to FIG. 28 having two tabs 115", 113", a bent end 150 and an angled end 151 additionally has two notches or incisions 152, 153 in the region of the end 151 in order to increase its elasticity.

The wall 116 according to FIG. 8 which results from the different shape of the recesses 37 and 38 and the wall according to FIG. 14 which is designed as a rib 84 serve as supporting stops for improving the securing of the slide in a clamping position so that it is thereby ensured that the clamping device is highly stable.

In FIG. 25 the border portions 74', 75' constitute supporting portions which retain the slide and the coupling region 154 constitutes a border portion of the slide, which portion supports the clamping elements or retaining parts. Such supporting portions at the same time form a border, for example, for the punched-through portions 12 (FIG. 2), 72 (FIG. 11) or 131, 132 and 136 (FIG. 25).

What is claimed is:

1. Clamping device for detachably connecting two profiled parts (1; 19), comprising:

a first profiled part (1) having an insert core (2; 61) inserted and secured therein, said insert core having an axially movable slide (7) with an end part for displacing a clamping element, said clamping element capable of at least partially being inserted into an opening in a second profiled part (19), said clamping element exerting clamping pressure against a portion of the second profiled part, said portion of said second profiled part partially closes an opening in the first profiled part through which said clamping element extends, wherein the insert core (2; 61) includes outer walls and rotating means provided through one of said outer walls for axially displacing said axially movable slide via a system of sliding surfaces which engage the axially movable slide, and wherein said outer walls of said insert core (2; 61) are defined by two wide and two narrow outer walls, and the rotating means engage the axially movable slide through a first wide outer wall, the axially movable slide has two mutually opposite border portions (74, 75; 74', 75'; 154) that are flat and in the form of a plate, and wherein the insert core (2; 61) has two elongated sliding surfaces disposed laterally in said insert core for guiding these two flat border portions (74, 75; 74', 75'; 154) of the axially movable slide, wherein a head (4) of an eccentric (5), is arranged rotatably in a bore (3) in said first wide outer wall of the insert core (2), wherein the head has a diameter which is larger than a nominal diameter of an eccentric roller (22), and wherein a resilient locking plate (43), is arranged such that it slides into an interior of the insert core (2) adjacent to an inside portion of said first wide outer wall, said resilient locking plate having a fork-like opening (50) into which an eccentric neck (20), of the eccentric (5) is displaceably inserted, and said locking plate (43) exerting spring pressure in the region of said fork-like opening (50) to outwardly push the eccentric (5) through the bore (3) in said first wide outer wall.

2. Clamping device according to claim 1, wherein the axially movable slide (7; 68) has a coupling portion (9; 118; 121) which is axially rotated through 90° with respect to a sliding plane, said coupling portion for supporting the clamping element (15, 16; 117; 119, 120).

3. Clamping device according to claim 2, wherein said end part of said axially movable slide has a flat, plate-shaped border portion (154) designed as a punched part, said end part having at least one clear slot (131, 132) for supporting said clamping element (147).

4. Clamping device according to claim 1, wherein the elongated surfaces for guiding said axially movable slide are formed by slot-shaped openings (92, 93) in said two narrow walls.

5. Clamping device for detachably connecting two profiled parts (1; 19), comprising:
a first profiled part (1) having an insert core (2; 61) inserted and secured therein, said insert core having an axially movable slide (7) with an end part for displacing a clamping element, said clamping element capable of at least partially being inserted into an opening in a second profiled part (19), said clamping element exerting clamping pressure against a portion of the second profiled part, said portion of said second profiled part partially closes an opening in the first profiled part through which said clamping element extends, wherein the insert core (2; 61) includes outer walls and rotating means provided through one of said outer walls for axially displacing said axially movable slide via a system of sliding surfaces which engage the axially movable slide, and wherein said outer walls of said insert core (2; 61) are defined by two wide and two narrow outer walls, and the rotating means engage the axially movable slide through a first wide outer wall, the axially movable slide has two mutually opposite border portions (74, 75; 74', 75'; 154) that are flat and in the form of a plate, and wherein the insert core (2; 61) has two elongated sliding surfaces disposed laterally in said insert core for guiding these two flat border portions (74, 75; 74', 75'; 154) of the axially movable slide, wherein a first wide outer wall through which said rotating means is engaged includes a bore (3; 80) for receiving a head of an eccentric (5; 73), wherein the axially movable slide has a continuous cutout (12; 72) which interacts with an eccentric roller (22; 103) of the eccentric (5) to displace the axially movable slide into an interior of the insert core, and wherein the two mutually opposite border portions are guided by the elongated sliding surfaces of the insert core (2), wherein said continuous cutout (12) in the axially movable slide (7) is asymmetrical and is bounded partially by two border walls (27, 28) running at least approximately perpendicularly to a longitudinal axis of the axially movable slide, said continuous cutout further bounded by a border wall (29) running parallel to said longitudinal axis, and by a border wall (30) which is arcuate in a region near said end part for displacing said clamping element, and such that said border wall (30) is oblique in an opposite region.

6. Clamping device according to claim 5, wherein the eccentric (5) has an eccentric stop roller (23) arranged next to the eccentric roller (22), and coaxially with the eccentric head (4) and wherein said eccentric stop roller fits into a round recess (37), said round recess disposed in a second, wide outer wall of the insert core (2).

7. Clamping device for detachably connecting two profiled parts (1; 19), comprising:
a first profiled part (1) having an insert core (2; 61) inserted and secured therein, said insert core having an axially movable slide (7) with an end part for displacing a clamping element, said clamping element capable of at least partially being inserted into an opening in a second profiled part (19), said clamping element exerting clamping pressure against a portion of the second profiled part, said portion of said second profiled part partially closes an opening in the first profiled part through which said clamping element extends, wherein the insert core (2; 61) includes outer walls and rotating means provided through one of said outer walls for axially displacing said axially movable slide via a system of sliding surfaces which engage the axially movable slide, and wherein said outer walls of said insert core (2; 61) are defined by two wide and two narrow outer walls, and the rotating means engage the axially movable slide through a first wide outer wall, the axially movable slide has two mutually opposite border portions (74, 75; 74', 75'; 154) that are flat and in the form of a plate, and wherein the insert core (2; 61) has two elongated sliding surfaces disposed laterally in said insert core for guiding these two flat border portions (74, 75; 74', 75'; 154) of the axially movable slide, wherein a first wide outer wall through which said rotating means is engaged includes a bore (3; 80) for receiving a head of an eccentric (5; 73), wherein the axially movable slide has a continuous cutout (12; 72) and a wall (30; 57) which interacts with an eccentric roller (22; 103) of the eccentric to displace the axially movable slide into an interior of the insert core, and wherein the two mutually opposite border portions are guided by the elongated sliding surfaces of the insert core (2), wherein said continuous cutout (12) in the axially movable slide (7) is asymmetrical and is bounded partially by two border walls (27, 28) running at least approximately perpendicularly to a longitudinal axis of the axially movable slide, said continuous cutout further bounded by a border wall (29) running parallel to said longitudinal axis, and by a border wall (30) which is arcuate in a region near said end part for displacing said clamping element, and such that said border wall (30) is oblique in an opposite region, and wherein the eccentric (5) has an eccentric stop roller (23) which is arranged next to the eccentric roller (22), and coaxially with the eccentric head (4) and wherein said eccentric stop roller fits into a round recess (37), said round recess disposed in a second, wide outer wall of the insert core (2), and wherein said round recess (37) communicates with a further recess (38), said further recess having an at least approximately crescent-shaped cross-section, and the eccentric stop roller (23) has an at least approximately crescent-shaped cross-section such that the eccentric stop roller (23) can be inserted, at a suitable rotary position, into said further recess (38).

8. Clamping device for detachably connecting two profiled parts (1; 19), comprising:
a first profiled part (1) having an insert core (2; 61) inserted and secured therein, said insert core having an axially movable slide (7) with an end part for displacing a clamping element, said clamping element capable of at least partially being inserted into an opening in a second profiled part (19), said clamping element exerting clamping pressure against a portion of the second profiled part, said portion of said second profiled part partially closes an opening in the first profiled part through which said clamping element extends, wherein the insert core (2; 61) includes outer walls and rotating means provided through one of said outer walls for axially displacing said axially movable slide via a system of sliding surfaces which engage the axially movable slide, and wherein said outer walls of said insert core (2; 61) are defined by two wide and two narrow outer walls, and the rotating means engage the axially movable slide through a first wide outer wall, the axially movable slide has two mutually opposite border portions (74, 75; 74', 75'; 154) that are flat and in the form of a plate, and wherein the insert core (2; 61) has two elongated sliding surfaces disposed laterally in said insert core for guiding these two flat border portions (74, 75; 74', 75'; 154) of the axially movable slide, wherein an eccentric head of an eccentric (73), is arranged rotatably in a bore (80) in said first wide outer wall (91) of the insert core, said head having a diameter smaller than a nominal diameter of an eccentric roller (103) of the eccentric (73), and wherein an end face of the eccentric has a cylindrical recess (106) in which is held a compression spring (107) for pressing the eccentric (73) outwards.

9. Clamping device for detachably connecting two profiled parts (1; 19), comprising:
a first profiled part (1) having an insert core (2; 61) inserted and secured therein, said insert core having an axially movable slide (7) with an end part for displacing a clamping element, said clamping element capable of at least partially being inserted into an opening in a second profiled part (19), said clamping element exerting clamping pressure against a portion of the second profiled part, said portion of said second profiled part partially closes an opening in the first profiled part through which said clamping element extends, wherein the insert core (2; 61) includes outer walls and rotating means provided through one of said outer walls for axially displacing said axially movable slide via a system of sliding surfaces which engage the axially movable slide, and wherein said outer walls of said insert core (2; 61) are defined by two wide and two narrow outer walls, and the rotating means engage the axially movable slide through a first wide outer wall, the axially movable slide has two mutually opposite border portions (74, 75; 74', 75'; 154) that are flat and in the form of a plate, and wherein the insert core (2; 61) has two elongated sliding surfaces disposed laterally in said insert core for guiding these two flat border portions (74, 75; 74', 75'; 154) of the axially movable slide, wherein the elongated sliding surfaces are formed by grooves (35, 36) in an interior surface of said outer walls of the insert core.

10. A clamping device for detachably connecting a first profiled part to a second profiled part, said clamping device comprising:
an insert core to be inserted and secured in said first profiled part, said insert core having four outer walls, including two wide outer walls and two narrow walls, wherein said insert core and said first profiled part have a mutually corresponding transverse bore in a first outer wall of each of said insert core and said first profiled part, and further wherein said insert core has a plurality of sliding surfaces on an interior of said four outer walls;
an axially movable slide disposed in said insert core, said axially movable slide including an upper coupling portion, a central eccentric portion, and a bottom portion, wherein said axially movable slide further includes a cutout portion in said central eccentric portion, and two mutually opposite border portions that are flat and in the form of a plate, said border portions for guiding said axially movable slide via said plurality of sliding surfaces during axial movement;
an eccentric mounted transversely through said transverse bore of said insert core, said eccentric for axial displacing said axially movable slide, said eccentric comprising an eccentric head on a first end of the eccentric, followed by an eccentric neck, an eccentric roller, and an eccentric stop roller, said stop roller disposed on a second end of said eccentric, wherein said eccentric head is rotatably mounted in said transverse bore of said insert core, wherein said eccentric roller is disposed through said cutout portion of said axially movable slide, and wherein said eccentric roller has an axis of rotation offset from an axis of rotation of said eccentric head;
a plurality of retaining elements for insertion into and clamping said second profiled part to said first profiled part, said plurality of retaining elements displaced by said upper coupling portion of said axially movable slide; and
a resilient locking plate for locking said insert core into said first profiled part, said resilient locking plate inserted into said insert core along an inside surface of said first wide outer wall of said insert core, said resilient locking plate guided by said plurality of sliding surfaces.

11. The clamping device according to claim 10, wherein said upper coupling portion of said axially movable slide is a projection having a sword-like shape axially rotated through 90° with respect to a sliding plane, such that said upper coupling portion axially rotates said retaining elements for clamping when said axially movable slide is displaced via turning of said eccentric head.

12. The clamping device according to claim 10, wherein said resilient locking plate has a locking plate end part formed in a U-shape such that said eccentric neck can be received by said locking plate end part when said resilient locking plate is inserted, and wherein said resilient locking plate includes a spring tongue for pressing said resilient locking plate against said inside surface of said first wide outer wall, said resilient locking plate thereby applying outward spring pressure on said eccentric for projecting the eccentric head through said transverse bore of said first profiled part.

13. The clamping device according to claim 11, wherein said insert core has a recess for receiving said eccentric stop roller, said recess is disposed such that when said eccentric is rotated in an insert/remove position, said eccentric stop roller can be received in said recess allowing said eccentric to be pushed into said insert core to the extent that a top of said eccentric head is flush with a surface of said first wide outer wall, whereby said insert core can be removably inserted into said first profiled part.

14. The clamping device according to claim 10, wherein said upper coupling portion of said axially movable slide has a sword-like shape with a coupling end rotated about 360° forming a loop, wherein said plurality of retaining elements are latches connected to said coupling end by a support shaft.

15. A clamping device for detachably connecting a first profiled part to a second profiled part, said clamping device comprising:

an insert core to be inserted and secured in said first profiled part, said insert core having four outer walls, including two wide outer walls and two narrow outer walls, wherein said insert core and said first profiled part have a mutually corresponding transverse bore in a first wide outer wall of each of said insert core and said first profiled part, and further wherein said insert core has a plurality of sliding surfaces on an interior of said four outer walls;

an axially movable slide disposed in said insert core, said axially movable slide including an upper coupling portion, a central eccentric portion, and a bottom portion, wherein said axially movable slide further includes a cutout portion in said central eccentric portion, and two mutually opposite border portions that are flat and in the form of a plate, said border portions for guiding said axially movable slide via said plurality of sliding surfaces during axial movement;

an eccentric mounted transversely through said transverse bore of said insert core, said eccentric for axial displacing said axially movable slide, said eccentric comprising an eccentric head on a first end of the eccentric, followed by an eccentric neck, an eccentric roller, and an eccentric stop roller, said stop roller disposed on a second end of said eccentric, wherein said eccentric head is rotatable mounted in said transverse bore of said insert core, wherein said eccentric roller is disposed through said cutout portion of said axially movable slide, and wherein said eccentric roller has an axis of rotation offset from an axis of rotation of said eccentric head;

a plurality of retaining elements for insertion into and clamping said second profiled part to said first profiled part, said plurality of retaining elements displaced by said upper coupling portion of said axially movable slide;

a first spring is provided transversely in said insert core to apply spring pressure to said eccentric in an outward direction, for locking said insert core into said first profiled part; and a second spring is provided behind said bottom portion of said axially movable slide to push said axially movable slide toward said second profiled part;

wherein said upper coupling portion of said axially movable slide has a sword-like shape with a coupling end rotated about 360° forming a loop, and wherein said plurality of retaining elements are latches connected to said coupling end by a support shaft.

* * * * *